United States Patent Office 3,386,801
Patented June 4, 1968

3,386,801
ALKALI METAL AND ALKYLAMMONIUM PHOS-
PHATOALUMINATE COMPLEXES AND THE
PREPARATION OF CRYSTALLINE ALUMINO-
SILICATES
Guenter H. Kuehl, Morrisville, Pa., assignor to Mobil Oil
Corporation, a corporation of New York
No Drawing. Continuation-in-part of application Ser. No.
294,229, July 11, 1963. This application Feb. 1, 1966,
Ser. No. 523,936
19 Claims. (Cl. 23—105)

This application is a continuation-in-part of copending application Ser. No. 294,229, filed on July 11, 1963, and now abandoned.

This invention relates to a method of preparing crystalline aluminosilicates and, more particularly, to a novel technique for increasing the silica to alumina ratio of a crystalline aluminosilicate from a given quantity of reactants.

Zeolitic materials, both natural and synthetic, have been demonstrated in the past to have catalytic capabilities for various types of hydrocarbon conversion. Certain zeolitic materials are ordered, porous crystalline aluminosilicates having a definite crystalline structure within which there are a large number of small cavities which are interconnected by a number of still smaller channels. These cavities and channels are precisely uniform in size. Since the dimensions of these pores are such as to accept for adsorption molecules of certain dimensions while rejecting those of larger dimensions, these materials have come to be known as "molecular sieves" and are utilized in a variety of ways to take advantage of these properties.

Such molecular sieves include a wide variety of positive ion-containing crystalline aluminosilicates, both natural and synthetic. These aluminosilicates can be described as a rigid three-dimensional network of $SiO_4$ and $AlO_4$ tetrahedra in which the tetrahedra are cross-linked by the sharing of oxygen atoms whereby the ratio of the total aluminum and silicon atoms to oxygen atoms is 1:2. The electrovalence of the tetrahedra containing aluminum is balanced by the inclusion in the crystal of a cation, for example, an alkali metal or an alkaline earth metal cation. This equilibrium can be expressed by formula wherein the ratio Al to the number of the various cations, such as Ca/2, Sr/2, Na, K or Li, is equal to unity. One type of cation may be exchanged either in entirety or partially by another type of cation utilizing ion exchange techniques in a conventional manner. By means of such cation exchange, it is possible to vary the size of the pores in the given aluminosilicate by suitable selection of the particular cation. The spaces between the tetrahedra are occupied by molecules of water prior to dehydration. The parent zeolite is dehydrated to activate it for use as a catalyst.

A description of such zeolites and examples of their uses are found in Patents 2,971,824 and 3,033,778, whose disclosures are hereby incorporated herein by reference.

In the case of synthetic crystalline aluminosilicates, the silica/alumina ratio is essentially determined by the specific materials and the relative quantities of such materials used in the preparation of the aluminosilicate. For example, synthetic crystalline aluminosilicates are ordinarily prepared initially in the sodium form of crystal, the process of preparation involving heating, in aqueous solution, an appropriate mixture of oxides, or of materials whose chemical composition can be completely represented as a mixture of oxides $Na_2O$, $Al_2O_3$, $SiO_2$ and $H_2O$ at a temperature of approximately 100° C. for periods of 15 minutes to 90 hours or more. The product which crystallizes within this hot mixture is separated therefrom and water washed until the water in equilibrium with the aluminosilicate has a pH in the range of 9 to 12. The aluminosilicate may then be activated by heating until dehydration is attained.

In conventional processes, in order to obtain a crystalline aluminosilicate product with a given $SiO_2/Al_2O_3$ ratio, it is invariably necessary to use a starting mixture of materials in which the oxide ratio of $SiO_2$ to $Al_2O_3$ is substantially greater than that in the finished product. Merely by way of example, in order to make a conventionally available molecular sieve Y (see Canadian Patent No. 639,645 for a description of molecular sieve Y) having an $SiO_2/Al_2O_3$ molar ratio of about 3–4, it is necessary to use a reaction mixture containing an $SiO_2/Al_2O_3$ molar ratio of about 8.0 to 30.0. In light of the above, the preparation of crystalline aluminosilicates by conventional methods ordinarily involves a significant waste of the silica-contributing component of the reaction mixture since only a portion of this reactant will be utilized in the reaction.

In accordance with the present invention, it has now been discovered that synthetic crystalline aluminosilicates may be prepared by a novel technique which not only permits the utilization of stoichiometric quantities of reactants without the necessity for the excess of materials required by prior art techniques but which permits such aluminosilicate synthesis at lower cost than has previously been possible.

It is accordingly a primary object of the present invention to provide a novel process for making porous synthetic crystalline aluminosilicates which permits the use of a lower $SiO_2/Al_2O_3$ ratio in the starting mixture to obtain a crystalline aluminosilicate having a given $SiO_2/Al_2O_3$ ratio.

It is another object of the present invention to provide a novel process for obtaining crystalline aluminosilicates wherein starting mixtures may be used which more clearly approximate stoichiometric ratios of reactants and which permit the obtaining of synthetic crystalline aluminosilicates at lower cost.

It is another important object of the present invention to provide a novel process for producing a crystalline aluminosilicate and isomorphs thereof through the interaction of the appropriate hydroxymetallate ions and either silicate ions or their isomorph counterparts, said hydroxymetallate ions being maintained at a substantially constant level substantially throughout the period of formation of the aluminosilicate or its isomorph through the maintenance of an equilibrium condition in said mixture.

It is still another important object of the present invention to provide a novel process for producing a crystalline aluminosilicate wherein said aluminosilicate is formed from a reaction mixture containing hydroxyaluminate ions and silicate ions, said hydroxyaluminate ions being maintained at a substantially constant level substantially throughout the period of formation of the aluminosilicate through the maintenance of an equilibrium condition in said mixture.

It is a further important object of the present invention to provide a novel method of making a crystalline aluminosilicate wherein the aluminosilicate is formed from the interaction between hydroxyaluminate ions and silicate ions and wherein said hydroxyaluminate ions are maintained at a substantially constant level substantially throughout the period of formation of the aluminosilicate by means of a complexing agent which provides an aluminum complex under alkaline conditions which is in dynamic equilibrium with said hydroxyaluminate ions.

It is still another important object of the present invention to provide a novel process for forming crystalline aluminosilicates from a reaction mixture containing phosphatoaluminate ions, hydroxyaluminate ions, silicate ions and at least one cation which, in the final aluminosilicate product, will balance the electrovalence of the aluminosilicate tetrahedra.

It is still another important object of the present invention to provide novel complexes useful in forming crystalline aluminosilicates.

These and other important advantages of the present invention will become more apparent upon reference to the ensuing description and appended claims.

In accordance with the present invention it has been found that crystalline aluminosilicates having higher $SiO_2/Al_2O_3$ ratios than would otherwise be attainable with a given starting mixture may be readily and economically synthesized through the utilization of a reaction mixture containing a complex which serves to regulate the quantity of alumina available to form the desired aluminosilicate.

As previously indicated, crystalline aluminosilicates are conventionally prepared from a reaction mixture containing an $SiO_2$ source and an $Al_2O_3$ source. For example, in the preparation of sodium zeolite X, suitable reagents for the source of silica include silica sol, silica gel, silicic acid or sodium silicate. Alumina can be supplied by utilizing activated alumina, gamma alumina, alpha alumina, alumina trihydrate or sodium aluminate. Sodium hydroxide is suitably used as the source of the sodium ion and, in addition, contributes to the regulation of the pH. The reaction mixture, which conventionally includes water as the reaction medium, is then heated sufficiently to allow an amorphous precipitate to crystallize. Before the desired crystallization of the aluminosilicate takes place, however, a complex hydroxyaluminate $[Al(OH)_4]^-$ is formed. This hydroxyaluminate is postulated to be necessary for the formation of the crystalline aluminosilicate and, in fact, the $$SiO_2/Al_2O_3$$

ratio in the final aluminosilicate product bears a direct relationship to the quantity of available hydroxyaluminate ions in the reaction mass with a given concentration of $SiO_2$.

In conventional processes of forming aluminosilicates utilizing sodium metasilicate as the $SiO_2$ source, where relatively high pH's are used to depolymerize the silicate component to the desired extent, a large quantity of hydroxyaluminate ions is present in the reaction mixture and, as a result, a large amount of $Al_2O_3$ combines with a relatively small quantity of $SiO_2$ to produce a product with a relatively low $SiO_2/Al_2O_3$ ratio. For example, commercially available molecular sieve X requires a reaction mixture with an $SiO_2/Al_2O_3$ ratio of approximately 3–5 to obtain a crystalline aluminosilicate having an $SiO_2/Al_2O_3$ ratio of approximately 2–3; commercially available molecular sieve Y utilizes a reaction mixture with an approximately 8–30 $SiO_2/Al_2O_3$ ratio to obtain a product with an $SiO_2/Al_2O_3$ ratio of about 3–4. As previously pointed out, this results in a significant wastage of $SiO_2$ component.

The process of the present invention overcomes the above problems by introducing into the reaction mixture an agent capable of complexing aluminum which serves to regulate and to maintain substantially constant through- out the reaction the quantity of hydroxyaluminate ions in the reaction mixture. More specifically, it has been discovered that certain aluminum complexes are maintained in a dynamic equilibrium condition in aqueous solution with the hydroxyaluminate ions and, as a result, are capable of maintaining the quantity of hydroxyaluminate ions in solution at a substantially constant level throughout the period of interaction between the hydroxyaluminate ions and the silicate component. The effect of this phenomenon on the aluminosilicate crystallization is to cause the hydroxyaluminate to react with greater quantities of silicate and to produce a product with a greater $SiO_2/Al_2O_3$ ratio than would otherwise have been possible with the same relative quantities of the $SiO_2$ and $Al_2O_3$ components.

The following example will illustrate this fact:

EXAMPLE 1

Aluminum phosphate, 6.1 g. (50 millimoles), was dissolved with a solution of 53.5 g. of trisodium phosphate dodecahydate (140 millimoles) in 100 ml. of water at a temperature below 60° C. Traces of impurities were filtered off and the filtrate diluted to 250 ml. with water. A solution of 13.75 g. (50 millimoles) of sodium metasilicate (21.8% $SiO_2$; 24.2% $Na_2O$) in 50 ml. of water was added under stirring within two seconds and the stirring discontinued when the mixture had gelled. The reaction mixture was placed at a constant temperature of 100° C. After six days the crystallization started and was complete after nine days. The mixture was filtered, the product washed with water and dried.

The composition of the reaction mixture can be summarized as follows:

Molar ratio—
$SiO_2/Al_2O_3$ _____ 2.0
$Na_2O/Al_2O_3$ _____ 10.6
$Na_2O/P_2O_5$ _____ 2.79
$P_2O_5/Al_2O_3$ _____ 3.81
$H_2O/Na_2O$ _____ca__ 63

The properties of the product were:

Wt. percent—
$SiO_2$ _____ 57.3
$Al_2O_3$ _____ 24.7
$Na_2O$ _____ 14.8
Molar ratio, $SiO_2/Al_2O_3$ _____ 3.95
Crystal structure _____ Faujasite
Cyclohexane sorption, g./100 g. sample _____ 18.77
Water sorption, g./100 g. sample _____ 30.35

From the foregoing example, it will be seen that the present invention makes possible the synthesis of a crystalline aluminosilicate with a high $SiO_2/Al_2O_3$ ratio from a reaction mixture with a low $SiO_2/Al_2O_3$ component ratio. As a result, the present process provides a lower cost method for making crystalline aluminosilicates since significantly lower quantities of silicate component may be used in the reaction mixture.

The complexing agent which may be employed may be any complexing agent which provides a stable aluminum complex under alkaline conditions; such a complex will always be in equilibrium with the hydroxyaluminate ions.

The preferred complex is the phosphatoaluminate complex. Representative of phosphatoaluminate complexes usable in the process of the present invention are those having the general formulae $M_{3/n}[Al(PO_4)_2]$ and $$M_{6/n}[Al(PO_4)_3]$$

wherein M is a cation that can form a soluble phosphate in alkaline medium and $n$ is the valence of M. While not so limited, preferred values of M are alkali metal (preferably sodium or potassium) and $R_4N$ wherein R is any alkyl group. The preferred value of R, though the phosphatoaluminate complexes are not so limited, is methyl. Generally speaking, the preferred sources of the phosphate ions are trisodium phosphate, tripotassium phosphate and tri(tetramethylammonium) phosphate (aluminum phosphate being soluble in each of these), though it is to be understood that the invention is not limited to these materials.

Also especially advantageous in carrying out the process of the present invention is the arsenatoaluminate complex (see Example 9), whose general formulae can be represented as:

$$M'_{3/n'}[Al(AsO_4)_2] \text{ and } M'_{6/n'}[Al(AsO_4)_3]$$

wherein M' is a cation that can form a soluble arsenate in alkaline medium and n' is the valence of M'.

In addition, other complexing agents meeting the general definition set forth above may also be used within the framework of the present invention. For example, complexes of aluminum with tartrate (see Example 10), citrate (see Example 11), salicylate (see Example 12), phytate, sulfate, perchlorate, oxalate and gluconate may also be used. Still another excellent example is represented by the complex of aluminum with ethylenediaminetetraacetate (see Example 13), the ethylenediaminetetraacetate ions being suitably provided by means of disodium dihydrogen ethylenediaminetetraacetate. Of the above, the complexes with phosphate, arsenate, tartrate, citrate, salicylate, phytate and ethylenediaminetetraacetate are preferred.

Using the phosphatoaluminate complex for purposes of illustration, the general equation for the complex formation may be represented as follows (aluminum phosphate being set forth as the source of the aluminate ions for illustrative purposes):

$$AlPO_4 + M_3PO_4 \rightarrow M_3[Al(PO_4)_2]$$

wherein M has the values previously indicated. In aqueous solution, the phosphatoaluminate complex is in equilibrium with the hydroxyaluminate ions according to the following equation:

$$[Al(PO_4)_2]^{\equiv} + 4OH^- \rightleftharpoons [Al(OH)_4]^- + 2PO_4^{\equiv}$$

The hydroxyl ions in this equilibrium are provided by the partial hydrolysis of $M_3PO_4$ and alkali silicate (when the latter is used as the source of $SiO_2$) or are otherwise present in the alkaline reaction mixture necessary for carrying out the process of the present invention. As a result, the amount of hydroxyaluminate available to react with the silicate component of the reaction mixture depends upon the pH of the mixture. If the pH is too high, the equilibrium is shifted towards the right to result in greater formation of hydroxyaluminate. As a consequence, too much hydroxyaluminate will be available to react with the silicate component of the mixture and the resulting aluminosilicate will have a lower $SiO_2/Al_2O_3$ ratio. On the other hand, if the pH is too low, the concentration of hydroxyaluminate is insufficient to permit the crystallization of the desired zeolite and a different zeolite may crystallize.

As will be apparent, the particular pH of the reaction mixture required for satisfactory results will necessarily vary depending upon the materials utilized. With a phosphatoaluminate complexing agent, best results are obtained using a pH of approximately 9–13 and preferably about 9–12, the optimum minimum pH for the production of an aluminosilicate having a faujasite-type structure being approximately 11.0±0.2. With pH's below approximately 11.0±0.2, non-faujasite-type crystalline aluminosilicates are obtained. For example, a pH of about 10–11 will result in the formation of a crystal structure belonging to the chabasite-gmelinite family. Increased alkalinity of the reaction mixture would result in a more advanced depolymerization of the silicate component. Other complexing agents may permit the use of such increased alkalinity without a proportionate decrease in the stability of the aluminate complex and a resulting proportionate increase in the quantity of hydroxyaluminate ions. The latter would, of course, as previously indicated, reduce the $SiO_2/Al_2O_3$ ratio in the final product.

To demonstrate the effect of pH on the $SiO_2/Al_2O_3$ ratio of the resulting crystalline aluminosilicate, a series of runs were conducted in which a Y type aluminosilicate was prepared using a crystalline alumino-silicate having a 3.93 $SiO_2/Al_2O_3$ ratio as a seed. In these runs, the reaction mixture was prepared utilizing aluminum phosphate as the source of aluminate, trisodium phosphate as the source of the phosphate ions, sodium silicate as the source of silica, and water. The results of the crystallization for three different runs involving the use of increasing quantities of trisodium phosphate were as follows:

TABLE 1

[Constants: 3.05 g. AlPO$_4$; 13.75 g. sodium metasilicate (21.8% SiO$_2$; 24.2% Na$_2$O) overall SiO$_2$/Al$_2$O$_3$=4; total volume ca. 300 ml.]

| No. | Na$_3$PO$_4$, g. | Product | | Sorption, g./100 g. sample | |
|---|---|---|---|---|---|
| | | X-ray analysis | SiO$_2$/Al$_2$O$_3$ | Cyclohexane | Water |
| 1 | 23.1 | Faujasite | 4.05 | 15.85 | 26.45 |
| 2 | 34.65 | ...do... | 3.75 | 17.38 | 29.38 |
| 3 | 46.2 | ...do... | 3.65 | 18.45 | 30.85 |

As will be seen from the above, the greater the concentration of trisodium phosphate, the lower the final $SiO_2/Al_2O_3$ ratio in the crystalline aluminosilicate. This decrease in $SiO_2/Al_2O_3$ ratio is attributable to the increased NaOH formation resulting from the hydrolysis of the trisodium phosphate, which NaOH pushes the phosphatoaluminate-hydroxyaluminate equilibrium to the right, resulting in an increased quantity of hydroxyaluminate ions and a corresponding decrease in the $SiO_2/Al_2O_3$ ratio. This action may be represented by the following equations:

$$Na_3PO_4 + H_2O \rightleftharpoons Na_2HPO_4 + NaOH$$
$$Na_3[Al(PO_4)_2] + 4NaOH \rightleftharpoons Na[Al(OH)_4] + 2Na_3PO_4$$

Obviously, the higher hydroxyaluminate ion concentration results in a lower $SiO_2/Al_2O_3$ ratio.

Generally speaking, it is desirable that none of the cations of the complexing agent additive to the reaction mixture be hydrogen so that the incidence of complex ion formation will be increased. For example, in the case of the phosphatoaluminate complex, $PO_4^{\equiv}$ ions are necessary to form the phosphatoaluminate ions. When hydrogen ions are present in the reaction mixture, $HPO_4^{=}$ ions tend to form, detracting from the desired phosphatoaluminate formation.

It is possible, however, to use acid forms of complexing agents such as disodium hydrogen phosphate by using a mixture of disodium hydrogen phosphate and trisodium phosphate, enough of the latter being present to dissolve the aluminum component (viz., the aluminum phosphate) and enough of the disodium hydrogen phosphate being present to buffer the mixture at the proper pH. This is illustrated in Example 2:

EXAMPLE 2

Aluminum phosphate, 3.05 g. (25 millimoles), was dissolved with a solution of 26.75 g. of trisodium phosphate dodecahydrate (70 millimoles) in 50 ml. water at a temperature below 60° C. Traces of impurities were filtered off and 9.45 g. of disodium hydrogen phosphate heptahydrate (35 millimoles) and 150 ml. of water added to the filtrate. When the crystals were dissolved, the solution was diluted to 250 ml. with water and a solution of 13.75 g. (50 millimoles) of sodium metasilicate (21.8% SiO$_2$; 24.2% Na$_2$O) in 50 ml. water added under stirring within two seconds. The stirring was discontinued when the mixture had gelled. The reaction mixture was placed at constant temperature of 100° C. After six days the reaction mixture was removed from the temperature bath, filtered, the product washed with water and dried.

The composition of the reaction mixture can be summarized as follows:

Molar ratio—
$SiO_2/Al_2O_3$ — 4.0
$Na_2O/Al_2O_3$ — 15.6
$Na_2O/P_2O_5$ — 2.98
$P_2O_5/Al_2O_3$ — 5.24
$H_2O/Na_2O$ — ca. 86

The properties of the product were:

Wt. percent—
$SiO_2$ — 61.1
$Al_2O_3$ — 23.6
$Na_2O$ — 14.8
Molar ratio, $SiO_2/Al_2O_3$ — 4.40
Crystal structure — Faujasite
Cyclohexane sorption, g./100 g. sample — 13.96
Water sorption, g./100 g. sample — 22.9

[Note: The sorptive capacities for which figures are given above are lower than would normally be obtained; such low figures are attributable to the fact that the run involved was prematurely terminated before the crystallization was complete.]

There are, of course, still other situations in which the acid form of the complexing agent [viz., disodium hydrogen phosphate, dipotassium hydrogen phosphate, di(tetra-alkylammonium) hydrogen phosphate] may be used without difficulty. Thus, when the alumina source is a sodium salt such as sodium aluminate, disodium hydrogen phosphate may be used as the phosphate source so as to keep the pH low. The latter condition is desirable since an undue increase in the pH of the reaction mixture and, as previously indicated, the resulting increase in hydroxy-aluminate ion concentration will tend to decrease the final $SiO_2/Al_2O_3$ ratio in the crystalline aluminosilicate which is prepared. As an example of the use of sodium aluminate as the alumina source and disodium hydrogen phosphate as the phosphate source, the following example is provided:

EXAMPLE 3

Sodium aluminate (40.2% $Al_2O_3$; 36.2% $Na_2O$), 2.73 g., equivalent to 10.8 millimoles of $Al_2O_3$, was dissolved in 50 ml. of water. A solution of 18.85 g. of disodium hydrogen phosphate heptahydrate (70 millimoles) in 50 ml. of water was added. The mixture was diluted with water to 150 ml. Under stirring, a solution of 13.75 g. (50 millimoles) of sodium silicate (21.8% $SiO_2$; 24.2% $Na_2O$) in 50 ml. of water was added within two seconds. The stirring was discontinued when a gel had been formed, and the mixture placed at a constant temperature of 90° C. After five days the crystallization was complete.

The composition of the reaction mixture can be summarized as follows:

Molar ratio—
$SiO_2/Al_2O_3$ — 4.64
$Na_2O/Al_2O_3$ — 13.0
$Na_2O/P_2O_5$ — 3.99
$P_2O_5/Al_2O_3$ — 3.26
$H_2O/Na_2O$ — ca. 80

The properties of the product were:

Wt. percent—
$SiO_2$ — 57.5
$Al_2O_3$ — 26.3
$Na_2O$ — 17.5
Molar ratio, $SiO_2/Al_2O_3$ — 3.71
Crystal structure — Faujasite
Cyclohexane sorption, g./100 g. sample — 18.5
Water sorption, g./100 g. sample — 31.9

Still another example involving the use of the acid form of the complexing agent, in which the pH of the reaction mixture was even lower than that of the run of Example 3, is set forth below in Example 4. Due to the lower pH, the $SiO_2/Al_2O_3$ ratio of the product was higher than that obtained in the run of Example 3 (see Example 5 for a further illustration of the effect of pH on the resulting $SiO_2/Al_2O_3$ ratio).

EXAMPLE 4

Sodium aluminate (40.2% $Al_2O_3$; 36.2% $Na_2O$), 2.73 g., equivalent to 10.8 millimoles of $Al_2O_3$, was dissolved in 50 ml. of water. Disodium hydrogen phosphate heptahydrate, 28.3 g. (105 millimoles), and 50 ml. of water were added and the crystals dissolved. The mixture was diluted to 150 ml. with water and a specially prepared seed (see copending application Ser. No. 247,572, filed Dec. 27, 1962) added. Under stirring, a solution of 13.75 g. (50 millimoles) of sodium metasilicate (21.8% $SiO_2$; 24.2% $Na_2O$) in 50 ml. of water was added within two seconds. The stirring was discontinued when a gel had been formed, and the mixture placed at a constant temperature of 95° C. After three days the crystallization was complete.

The composition of the reaction mixture can be summarized as follows:

Molar ratio—
$SiO_2/Al_2O_3$ — 4.64
$Na_2O/Al_2O_3$ — 16.2
$Na_2O/P_2O_5$ — 3.32
$P_2O_5/Al_2O_3$ — 4.87
$H_2O/Na_2O$ — ca. 63

The properties of the product were:

Wt. percent—
$SiO_2$ — 58.9
$Al_2O_3$ — 24.2
$Na_2O$ — 16.45
Molar ratio, $SiO_2/Al_2O_3$ — 4.13
Crystal structure — Faujasite
Cyclohexane sorption, g./100 g. sample — 17.10
Water sorption, g./100 g. sample — 27.92

As previously indicated, the amount of hydroxyaluminate available for the formation of the aluminosilicate in the reaction mixture depends on the pH of the mixture. Expressed in a different way, and relating the amount of hydroxyaluminate to the quantity of sodium in the system including phosphatoaluminate ions, the amount of hydroxyaluminate ions is related to the $Na_2O/P_2O_5$ ratio. In this connection, whereas it was previously indicated that relatively pure faujasite can be obtained from mixtures having a lower pH limit of 11.0±0.2, this lower limitation expressed in terms of $Na_2O/P_2O_5$ molar ratio is about 3.0.

Consistent with the above, when sodium silicate is used as the silica source, a higher silica to alumina ratio of the reaction mixture has no significant effect on the composition of the product, since the $Na_2O/Al_2O_3$ and $Na_2O/P_2O_5$ ratios are also increasing proportionately. Thus, when the $SiO_2/Al_2O_3$ molar ratio of the reaction mixture used in Example 1 is doubled to approximately 4.0, the resulting crystalline aluminosilicate has an $SiO_2/Al_2O_3$ ratio not significantly different from that previously obtained. This is illustrated in the following example:

EXAMPLE 5

Aluminum phosphate, 3.05 g. (25 millimoles), was dissolved with a solution of 26.75 g. of trisodium phosphate dodecahydrate (70 millimoles) in 50 ml. of water. The filtered solution was diluted to 100 ml. with water. A solution of 13.75 g. (50 millimoles) of sodium silicate (21.8% $SiO_2$; 24.2% $Na_2O$) in 50 ml. of water was added under stirring within two seconds and the stirring discontinued, when the mixture had gelled. The reaction mixture was placed at a constant temperature of 90° C. After two days the crystallization was complete.

The composition of the reaction mixture can be summarized as follows:

Molar ratio—
- $SiO_2/Al_2O_3$ _____ 4.0
- $Na_2O/Al_2O_3$ _____ 12.8
- $Na_2O/P_2O_5$ _____ 3.34
- $P_2O_5/Al_2O_3$ _____ 3.81
- $H_2O/Na_2O$ _____ ca. 52

The properties of the product were:

Wt. percent—
- $SiO_2$ _____ 58.6
- $Al_2O_3$ _____ 26.6
- $Na_2O$ _____ 16.2

Molar ratio, $SiO_2/Al_2O_3$ _____ 3.74
Crystal structure _____Faujasite
Cyclohexane sorption,
   g./100 g. sample _____ 17.5
Water sorption,
   g./100 g. sample _____ 30.35

On the other hand, a higher $H_2O/Na_2O$ molar ratio of the reaction mixture results in a higher $SiO_2/Al_2O_3$ ratio of the crystalline aluminosilicate product. This is illustrated by the following example:

EXAMPLE 6

Aluminum phosphate, 3.05 g. (25 millimoles), was dissolved with a solution of 26.75 g. of trisodium phosphate dodecahydrate (70 millimoles) in 50 ml. of water. The filtered solution was diluted to 250 ml. with water. A solution of 13.75 g. (50 millimoles) of sodium silicate (21.8% $SiO_2$; 24.2% $Na_2O$) in 50 ml. of water was added under stirring within two seconds and the stirring discontinued when the mixture had gelled. The reaction mixture was placed at constant temperature of 90° C. After three days the crystallization was complete.

The composition of the reaction mixture can be summarized as follows:

Molar ratio—
- $SiO_2/Al_2O_3$ _____ 4.0
- $Na_2O/Al_2O_3$ _____ 12.8
- $Na_2O/P_2O_5$ _____ 3.34
- $P_2O_5/Al_2O_3$ _____ 3.81
- $H_2O/Na_2O$ _____ ca. 105

The properties of the product were:

Wt. percent—
- $SiO_2$ _____ 59.6
- $Al_2O_3$ _____ 24.9
- $Na_2O$ _____ 15.1

Molar ratio, $SiO_2/Al_2O_3$ _____ 4.8
Crystal structure _____Faujasite
Cyclohexane sorption,
   g./100 g. sample _____ 17.02
Water sorption,
   g./100 g. sample _____ 29.25

The crystallization time has a definite effect on the crystal structure which nucleates from the reaction mixture. For example, a fast crystallization with a reaction mixture normally used to produce a faujasite-type crystal structure will ordinarily result in the production of a relatively pure faujasite-type crystal. On the other hand, a long crystallization time may permit the nucleation of phillipsite (which has a higher growing rate than faujasite), thus contaminating the desired faujasite crystal product. This problem can be overcome by having a fast crystallization, which can be induced by seeding or aging at room temperature, the seed being completely free of phillipsite. The minimum seed to be effective is approximately 10–20% by weight of the total product. This may be illustrated by the following example:

EXAMPLE 7

Aluminum phosphate, 3.05 g. (25 millimoles), was dissolved with a solution of 80.25 g. of trisodium phosphate dodecahydrate (210 millimoles) in 100 ml. of water. The filtered solution was diluted to 250 ml. with water. Some synthetic sodium faujasite of a silica to alumina ratio of 3.93, which was free of phillipsite, was used as seed. Under stirring, a solution of 13.75 g. (50 millimoles) of sodium silicate (21.8% $SiO_2$; 24.2% $Na_2O$) in 50 ml. of water was added withinn two seconds and the stirring discontinued, when the mixture had gelled. The reaction mixture was placed at a constant temperature of 90° C. After two days the crystallization was complete.

The composition of the reaction mixture can be summarized as follows:

Molar ratio—
- $SiO_2/Al_2O_3$ _____ 4.0
- $Na_2O/Al_2O_3$ _____ 29.6
- $Na_2O/P_2O_5$ _____ 3.1
- $P_2O_5/Al_2O_3$ _____ 9.45
- $H_2O/Na_2O$ _____ca. 45

The properties of the product were:

Wt. percent—
- $SiO_2$ _____ 57.6
- $Al_2O_3$ _____ 26.1
- $Na_2O$ _____ 16.2

Molar ratio, $SiO_2/Al_2O_3$ _____ 3.75
Crystal structure _____Faujasite
Cyclohexane sorption,
   g./100 g. sample _____ 17.38
Water sorption,
   g./100 g. sample _____ 29.38

In an attempt to isolate and identify the aluminate complex responsible for the equilibrium condition making possible the process of the present invention, an experiment was conducted with respect to the formation of a tri(tetramethylammonium) phosphatoaluminate, as follows:

EXAMPLE 8

Tri(tetramethylammonium) phosphate solution was prepared by mixing solutions of tetramethylammonium hydroxide and phosphoric acid in the molar ratio of 3 to 1.

Under slight warming this solution of tri(tetramethylammonium) phosphate was saturated with aluminum phosphate. The dissolution is faster the more concentrated the solution. However, once dissolved, the complex is quite stable and is not decomposed by dilution.

The mixture was diluted with water and the excess of aluminum phosphate filtered off. From the filtrate water was evaporated by heating until a clear syrupy liquid was formed. When cooling down it solidified. It was dissolved in a small amount of water under warming. From this solution birefringent columns crystallized upon cooling. The crystals are easily soluble in water or methanol, less soluble in ethanol, insoluble in acetone, methyl ethyl ketone, ether and isopropanol. The solubility is practically identical with that of tri(tetramethylammonium) phosphate. Purification is difficult for this reason. However, a certain degree of purification has been attained by washing the crystals with isopropanol-ethanol (5:1) and then with isopropanol-ethanol (10:3). The result of the chemical analysis gave a molar proportion of 1Al: 2.02P: 2.84N. Taking into account that the substance was only moderately pure, this corresponds to the formula $[(CH_3)_4N]_3[Al(PO_4)_2]$. Other soluble phosphates form corresponding complexes.

The X-ray diffraction pattern of the tri(tetramethylammonium) phosphatoaluminate crystal is set forth in the following table:

TABLE 2.—X-RAY DIFFRACTION DATA OF TETRAMETHYLAMMONIUM PHOSPHATOALUMINATE MEASURED FROM A ONE RADIAN DEBYE-SCHERRER PATTERN

| dA. | I/I₀ | dA. | I/I₀ |
| --- | --- | --- | --- |
| 16.0 | 100 | 3.00 | 20 |
| 10.2 | 50 | 2.88 | 30 |
| 7.2 | 20 | 2.82 | 30 |
| 6.6 | 10 | 2.72 | 30 |
| 6.1 | 5 | 2.25 | 10 |
| 4.85 | 50 | 2.18 | 30 |
| 4.50 | 50 | 2.08 | 20 |
| 4.30 | 60 | 2.02 | 20 |
| 4.05 | 10 | 1.88 | 10 |
| 3.82 | 70 | 1.80 | 30 |
| 3.62 | 10 | 1.74 | 10 |
| 3.48 | 20 | 1.67 | 20 |
| 3.30 | 20 | 1.60 | 10 |
| 3.10 | 10 | 1.55 | 5 |

Reaction temperatures desirable to induce aluminosilicate formation from the reaction mixtures of the present invention are preferably about 80–125° C. for the preparation of faujasite-type crystals but may be higher for the preparation of other crystalline aluminosilicates. While lower temperatures can be used, such lower temperatures tend to reduce the crystallization rate which, in the usual situation, is undesirable. Where a faujasite-type crystal is desired to be obtained, stirring during the crystallization should be avoided since it tends to favor the formation of phillipsite.

In order to demonstrate the use of other complexes than phosphatoaluminates to create the equilibrium condition with the hydroxyaluminate which is necessary to increase the final $SiO_2/Al_2O_3$ ratios in the crystalline aluminosilicate, the runs of Examples 9–12 were conducted utilizing an arsenate, a tartrate, a citrate and an ethylenediaminetetraacetate, respectively, as complexing agents:

EXAMPLE 9

Sodium aluminate (40.2% $Al_2O_3$; 36.2% $Na_2O$), 3.16 g., equivalent to 12.5 millimoles of $Al_2O_3$, was dissolved in 50 ml. of water. Disodium hydrogen arsenate heptahydrate, 33.15 g. (105 millimoles), and 50 ml. of water were added and the crystals dissolved. The mixture was diluted to 150 ml. with water. Under stirring a solution of 13.75 g. (50 millimoles) of sodium metasilicate (21.8% $SiO_2$; 24.2% $Na_2O$) in 50 ml. of water was added within two seconds. The stirring was discontinued when a gel had been formed, and the mixture placed at constant temperature of 95° C. After six days the crystallization was complete.

The composition of the reaction mixture can be summarized as follows:

Molar ratio—
$SiO_2/Al_2O_3$ _____ 4.0
$Na_2O/Al_2O_3$ _____ 14.3
$Na_2O/As_2O_5$ _____ 3.35
$As_2O_5/Al_2O_3$ _____ 4.26
$H_2O/Na_2O$ _____ ca. 63

The properties of the product were:

Wt. percent—
$SiO_2$ _____ 55.6
$Al_2O_3$ _____ 26.7
$Na_2O$ _____ 17.6
Molar ratio, $SiO_2/Al_2O_3$ _____ 3.54
Crystal structure _____ Faujasite
Cyclohexane sorption, g./100 g. sample _____ 18.25
Water sorption, g./100 g. sample _____ 31.03

EXAMPLE 10

Sodium aluminate (40.2% $Al_2O_3$; 36.2% $Na_2O$), 3.16 g., equivalent to 12.5 millimoles of $Al_2O_3$, was dissolved in 50 ml. of water. Sodium hydrogen tartrate monohydrate, 10.0 g. (52.6 millimoles) and 50 ml. of water were added and the crystals dissolved. The mixture was diluted to 150 ml. with water. Under stirring a solution of 13.75 g. (50 millimoles) of sodium metasilicate (21.8% $SiO_2$; 24.2% $Na_2O$) in 50 ml. of water was added within two seconds. The stirring was discontinued when a gel had been formed and the mixture placed at constant temperature of 95° C. After three days the crystallization was complete.

The composition of the reaction mixture can be summarized as follows:

Molar ratio—
$SiO_2/Al_2O_3$ _____ 4.0
$Na_2O/Al_2O_3$ _____ 7.84
$Na_2O/C_4H_4O_6^=$ _____ 1.86
$C_4H_4O_6^=/Al_2O_3$ _____ 4.21
$H_2O/Na_2O$ _____ ca. 114

The properties of the product were:

Wt. percent—
$SiO_2$ _____ 55.1
$Al_2O_3$ _____ 29.1
$Na_2O$ _____ 17.7
Molar ratio, $SiO_2/Al_2O_3$ _____ 3.32
Crystal structure _____ Faujasite
Cyclohexane sorption, g./100 g. sample _____ 19.73
Water sorption, g./100 g. sample _____ 32.60

EXAMPLE 11

Sodium aluminate (40.2% $Al_2O_3$; 36.2% $Na_2O$), 3.16 g., equivalent to 12.5 millimoles of $Al_2O_3$, was dissolved in 50 ml. of water. Sodium citrate, 40 ml. of an aqueous solution containing 11.2 g. of citric acid and 4.26 g. of sodium hydroxide were added and the mixture diluted to 150 ml. with water. Under stirring a solution of 13.75 g. (50 millimoles) of sodium metasilicate (21.8% $SiO_2$; 24.2% $Na_2O$) in 50 ml. of water was added within two seconds. The stirring was discontinued when a gel had formed and the mixture placed at constant temperature of 95–100° C. After three days the crystallization was complete.

The composition of the reaction mixture can be summarized as follows:

Molar ratio—
$SiO_2/Al_2O_3$ _____ 4.0
$Na_2O/Al_2O_3$ _____ 10.0
$Na_2O/C_6H_5O_7^{-3}$ _____ 2.15
$C_6H_5O_7^{-3}/Al_2O_3$ _____ 4.66
$H_2O/Na_2O$ _____ ca. 89

The properties of the product were:

Wt. percent—
$SiO_2$ _____ 54.7
$Al_2O_3$ _____ 28.8
$Na_2O$ _____ 17.25
Molar ratio, $SiO_2/Al_2O_3$ _____ 3.23
Crystal structure _____ Faujasite
Cyclohexane sorption, g./100 g. sample _____ 17.7
Water sorption, g./100 g. sample _____ 29.5

EXAMPLE 12

Sodium aluminate (43.3% $Al_2O_3$; 37.7% $Na_2O$), 2.95 g., equivalent to 12.5 millimoles of $Al_2O_3$, was dissolved in 50 ml. of water. Salicylic acid, 9.6 g., was added and the mixture diluted to 150 ml. with water. Under stirring a solution of 13.75 g. (50 millimoles) of sodium metasilicate (21.8% $SiO_2$; 24.2% $Na_2O$) in 50 ml. of water was added within two seconds. The stirring was discontinued when a gel had formed and the mixture placed at constant temperature of 95–100° C. After nine days the crystallization was complete.

The composition of the reaction mixture can be summarized as follows:

Molar ratio—
$SiO_2/Al_2O_3$ _____ 4.0
$Na_2O/Al_2O_3$ _____ 5.72

Molar ratio—Continued
- $Na_2O/C_7H_6O_3$ _____ 1.03
- $C_7H_6O_3/Al_2O_3$ _____ 5.55
- $H_2O/Na_2O$ _____ ca. 155

The properties of the product were:

Wt. percent—
- $SiO_2$ _____ 55.9.
- $Al_2O_3$ _____ 27.3.
- $Na_2O$ _____ 17.4.

Molar ratio, $SiO_2/Al_2O_3$ _____ 3.48.
Crystal structure _____ Faujasite and trace of zeolite S.
Cyclohexane sorption, g./100 g. sample _____ 18.2.
Water sorption, g./100 g. sample _ 29.2.

The foregoing establishes that salicylate is an extremely effective complexing agent for the preparation of zeolite Y, its effectiveness being close to that of phosphate and arsenate.

EXAMPLE 13

Sodium aluminate (40.2% $Al_2O_3$; 36.2% $Na_2O$), 3.16 g., equivalent to 12.5 millimoles of $Al_2O_3$, was dissolved in 50 ml. of water. Disodium dihydrogen ethylenediaminetetraacetate dihydrate, 14.25 g., sodium hydroxide, 1 g., and 100 ml. of water were added and the solution diluted to 250 ml. with water. After seeding as in Example 7, a solution of 20.6 g. (75 millimoles) of sodium metasilicate (21.8% $SiO_2$; 24.2% $Na_2O$) in 50 ml. of water was added under stirring within two seconds. The stirring was discontinued when a gel had formed and the mixture placed at constant temperature of 95–100° C. After two days the crystallization was complete.

The composition of the reaction mixture can be summarized as follows:

Molar ratio—
- $SiO_2/Al_2O_3$ _____ 6.0
- $Na_2O/Al_2O_3$ _____ 11.9
- $Na_2O/EDTA$ _____ 3.94
- $EDTA/Al_2O_3$ _____ 3.04
- $H_2O/Na_2O$ _____ ca. 112

The properties of the product were:

Wt. percent—
- $SiO_2$ _____ 55.6
- $Al_2O_3$ _____ 26.5
- $Na_2O$ _____ 16.6

Molar ratio, $SiO_2/Al_2O_3$ _____ 3.56
Crystal structure _____ Faujasite
Cyclohexane sorption, g./100 g. sample _____ 19.3
Water sorption, g./100 g. sample _____ 30.3

The same experiment with a $SiO_2/Al_2O_3$ molar ratio of the mixture of 4.0 gave a faujasite with $SiO_2/Al_2O_3$=3.25.

In the following example, the application of the process of the present invention to the synthesis of non-faujasite-type crystalline alumino-silicates is illustrated:

EXAMPLE 14

Aluminum phosphate 6.1 g. (50 millimoles) was dissolved with a solution of 160.5 g. (420 millimoles) of trisodium phosphate dodecahydrate in 150 ml. of water at a temperature below 60° C. Traces of impurities were filtered off and the filtrate diluted to 250 ml. with water. A solution of 19.0 g. (100 millimoles) of colloidal silica (31.5% $SiO_2$) diluted with 50 ml. of water was added under stirring. The mixture was placed at a constant temperature of 95° C. After eight days, a crystalline product was isolated.

The composition of the reaction mixture can be summarized as follows:

Molar ratio—
- $SiO_2/Al_2O_3$ _____ 4.0
- $Na_2O/Al_2O_3$ _____ 25.4

Molar ratio—Continued
- $Na_2O/P_2O_5$ _____ 2.67
- $P_2O_5/Al_2O_3$ _____ 9.5
- $H_2O/Na_2O$ _____ ca. 26

The properties of the product were:

Wt. percent—
- $SiO_2$ _____ 61.1.
- $Al_2O_3$ _____ 23.6.
- $Na_2O$ _____ 15.27.

Molar ratio, $SiO_2/Al_2O_3$ _____ 4.40.
Crystal structure _____ Chabasite-gmelinite family.
n-Hexane sorption, g./100 g. sample _____ 1.07.
Water sorption, g./100 g. sample _____ 10.92.

The calcium form of this zeolite (about 95% exchanged) has the following sorption characteristics:

n-Hexane sorption, g./100 g. sample _____ 6.82
Water sorption, g./100 g. sample _____ 18.65

The foregoing portion of the specification sets forth a novel technique for increasing the $SiO_2/Al_2O_3$ molar ratio in crystalline aluminosilicates which is obtainable from a given quantity of reactants. It is to be understood, however, that the practice of the present invention is also applicable to the synthesis of isomorphs of said crystalline aluminosilicates. For example, the aluminate may be replaced by metallates such as that of gallium, the silicate by anions such as germanate. Thus, in addition to producing aluminosilicates, the process of the present invention is extremely effective for the production of products such as gallosilicates, aluminogermanates and gallogermanates. An example of the production of a gallosilicate having a faujasite crystal structure is set forth in Example 15:

EXAMPLE 15

A solution of 23.6 g. of disodium hydrogen phosphate and 9.95 g. of monosodium dihydrogen phosphate monohydrate was added to 30 ml. of a solution containing 66 mg. of Ga/ml. and 114 mg. of Na/ml. and the mixture diluted to 150 ml. with water. Under stirring a solution of 16.0 g. of sodium metasilicate nonahydrate in 50 ml. of water was added. A gel formed immediately. The mixture was placed at constant temperature of 90° C. After five days the crystallization was complete.

The composition of the reaction mixture can be summarized as follows:

Molar ratio—
- $SiO_2/Ga_2O_3$ _____ 4.0
- $Na_2O/Ga_2O_3$ _____ 23.5
- $Na_2O/P_2O_5$ _____ 2.80
- $P_2O_5/Ga_2O_3$ _____ 8.4
- $H_2O/Na_2O$ _____ ca. 33

The properties of the product were:

Wt. percent—
- $SiO_2$ _____ 46.9
- $Ga_2O_3$ _____ 39.0
- $Na_2O$ _____ 12.8

Molar ratio, $SiO_2/Ga_2O_3$ _____ 3.76
Crystal structure _____ Faujasite
Cyclohexane sorption, g./100 g. sample _____ 15.0
Water sorption, g./100 g. sample _____ 24.8

The advantages of the process of the present invention are many. In the first place, by eliminating the necessity for large excesses of reactants, more nearly stoichiometric ratios of starting materials may be employed. This, of course, permits the removal from the system by crystallization of practically all of the $SiO_2$ and $Al_2O_3$ components (or their isomorph counterparts) and thus avoids wastage. In addition, a cost saving results from the fact that the present process permits the ready recovery of complexing agents for re-use in the process. Thus, in the phosphatoaluminate system, most of the phosphate can be recovered by addition of sodium hydroxide to the filtrate of the product and subsequent cooling. The phosphate crystallizes as trisodium phosphate dodecahydrate (solubility 1.5 g./100 g. of water at 0° C.).

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

The invention claimed is:

1. In a process for preparing a crystalline material selected from aluminosilicates, gallosilicates, aluminogermanates and gallogermanates wherein said material is formed from the interaction between (a) hydroxymetallate ions selected from hydroxyaluminate and hydroxygallate and (b) ions selected from silicate and germanate, the improvement comprising: creating an equilibrium condition by the presence of a complexing agent that provides under alkaline conditions a complex selected from an aluminum complex and a gallium complex in the mixture containing said ions to be interacted, which complexing agent maintains the concentration of said hydroxymetallate ions at a substantially constant level substantially throughout the period of formation of said crystalline material.

2. A process as defined in claim 1 wherein said crystalline material is an aluminosilicate, said hydroxymetallate ions are hydroxy aluminate ions and the hydroxyaluminate ions are interacted with silicate ions.

3. A process as defined in claim 2 wherein the pH of said mixture is between about 9 and 13.

4. A process as defined in claim 2 wherein the pH of said mixture is at least about 11.0±0.2.

5. A process as defined in claim 2 wherein said mixture is aqueous.

6. In a process for preparing a crystalline aluminosilicate wherein said aluminosilicate is formed from the interaction between hydroxyaluminate ions and silicate ions, the improvement comprising: creating an equilibrium condition by the presence of a complexing agent that provides under alkaline conditions an aluminum complex with (a) phosphate, (b) arsenate, (c) tartrate, (d) citrate, (e) phytate or (f) ethylenediaminetetraacetate in the mixture containing said ions to be interacted, which complexing agent maintains the concentration of said hydroxyaluminate ions at a substantially constant level substantially throughout the period of formation of said crystalline aluminosilicate.

7. A process as defined in claim 6 wherein said aluminum complex is a phosphatoaluminate complex.

8. In a process of preparing a crystalline aluminosilicate, the improvement which comprises forming said aluminosilicate from a reaction mixture containing phosphate ions, phosphatoaluminate ions, hydroxyaluminate ions, silicate ions and at least one cation which, in the final aluminosilicate product, will balance the electrovalence of the aluminosilicate tetrahedra the pH of said reaction mixture being such as to maintain a sufficient quantity of phosphate ions in solution so as to maintain the concentration of said hydroxyaluminate ions at a substantially constant level substantially throughout the period of formation of said aluminosilicate.

9. A process as defined in claim 8 wherein said pH is at least about 11.0±0.2.

10. A process as defined in claim 8 wherein said phosphatoaluminate ions are introduced into said solution as part of a phosphatoaluminate complex selected from $M_{3/n}[Al(PO_4)_2]$ and $M_{6/n}[Al(PO_4)_3]$, wherein M is a cation that can form a soluble phosphate in an alkaline medium and $n$ is the valence of M.

11. A process as defined in claim 8 wherein the pH of said reaction mixture is sufficiently basic to maintain an equilibrium condition between $[Al(PO_4)_2]^\equiv$ ions and $[Al(OH)_4]^-$ ions in said mixture.

12. A process as defined in claim 11 wherein alumina is introduced into said reaction mixture by means of aluminum phosphate or sodium aluminate and phosphate ions are introduced into said reaction mixture by means of trisodium phosphate, tripotassium phosphate, disodium hydrogen phosphate, dipotassium hydrogen phosphate, tri (tetraalkylammonium) phosphate or di(tetraalkylammonium) hydrogen phosphate.

13. In a process for preparing a crystalline aluminosilicate wherein said aluminosilicate is formed from the interaction between hydroxyaluminate ions and silicate ions, the improvement comprising: creating an equilibrium condition by the presence of a complexing agent that provides under alkaline conditions an aluminum complex with (a) sulfate, (b) perchlorate, (c) oxalate or (d) gluconate in the mixture containing said ions to be interacted, which complexing agent maintains the concentration of said hydroxyaluminate ions at a substantially constant level substantially throughout the period of formation of said crystalline aluminosilicate.

14. In a process for preparing a crystalline aluminosilicate wherein said aluminosilicate is formed from the interaction between hydroxyaluminate ions and silicate ions, the improvement comprising: creating an equilibrium condition by the presence of a complexing agent that provides under alkaline conditions a salicylate aluminum complex in the mixture containing said ions to be interacted, which complexing agent maintains the concentration of said hydroxyaluminate ions at a substantially constant level substantially throughout the period of formation of said crystalline aluminosilicate.

15. A process as defined in claim 13 wherein said aluminum complex is an oxalate.

16. A complex of the formula $M_{3/n}[Al(PO_4)_2]$ wherein M is a cation that can form a soluble phosphate in an alkaline medium and $n$ is the valence M.

17. A complex as defined in claim 16 wherein M is (a) an alkali metal or (b) $R_4N$ wherein R is lower alkyl.

18. A complex as defined in claim 16 wherein M is sodium, potassium or tetramethylammonium.

19. A complex of the formula $M'_{3/n'}[Al(AsO_4)_2]$ wherein M' is a cation that can form a soluble arsenate in an alkaline medium and $n'$ is the valence of M'.

References Cited

UNITED STATES PATENTS

| | | | |
|---|---|---|---|
| 3,101,251 | 8/1963 | Howell | 23—113 |
| 3,114,603 | 12/1963 | Howell | 23—113 |

OTHER REFERENCES

Hamamoto: "Chemical Abstracts," vol. 49, 1955, pp. 1289–1290.

Pascal: "Nouveau Traite de Chemic Minerale," vol. VI, Masson et Cie, Paris, 1961, p. 643.

OSCAR R. VERTIZ, *Primary Examiner.*

HERBERT T. CARTER, *Examiner.*